United States Patent [19]

Turecek

[11] Patent Number: 5,711,478
[45] Date of Patent: Jan. 27, 1998

[54] PAPERBOARD TOP CLOSURE FOR A CONTAINER

[75] Inventor: John Turecek, Markham, Canada

[73] Assignee: Coleman Containers Limited, Etobicoke, Canada

[21] Appl. No.: 605,949

[22] Filed: Feb. 23, 1996

[51] Int. Cl.[6] ............................................. B65D 5/30
[52] U.S. Cl. ................. 229/195; 229/125.19; 229/23 BT
[58] Field of Search .......................... 229/23 BT, 125.19, 229/190, 195, 197

[56] References Cited

U.S. PATENT DOCUMENTS

| | | | |
|---|---|---|---|
| 1,481,973 | 1/1924 | Bachmann | 229/195 |
| 2,961,144 | 11/1960 | Anderson, Jr. | 229/125.19 |
| 3,682,369 | 8/1972 | Isakson | 229/195 |
| 3,908,889 | 9/1975 | Vjecsner | 229/197 |
| 4,114,798 | 9/1978 | Gardner | 229/190 |
| 4,313,555 | 2/1982 | Sieffert | 229/125.19 |
| 4,469,273 | 9/1984 | Smith | 229/125.19 |

FOREIGN PATENT DOCUMENTS

| | | | |
|---|---|---|---|
| 326959 | 6/1903 | France | 229/190 |
| 338139 | 5/1904 | France | 229/190 |

*Primary Examiner*—Gary E. Elkins
*Attorney, Agent, or Firm*—Eugene J.A. Gierczak

[57] ABSTRACT

A reusable container closure which telescopes over the open top or bottom of the container is formed by utilizing a one-piece paperboard blank which is cut, scored, and folded to present a central panel, and at least three side panels depending from the central panel. A first side panel has a corner flap. A second side panel has a notch. The first side panel and the second side panel meet to form a corner. The corner flap is folded about the corner to lie against the second side panel. The corner flap also has a friction stop folded to engage the notch, which extends through the notch. When the container closure is telescoped over the container, the container urges the friction stops towards the second side panel so that the container closure embraces the top of the container. When the container closure is later removed from the container, the friction stop is simply disengaged from the notch and the container closure may be flattened and returned for re-use.

19 Claims, 7 Drawing Sheets

5,711,478

PAPERBOARD TOP CLOSURE FOR A CONTAINER

FIELD OF INVENTION

This invention relates to a paperboard container closure for a container. More particularly, the container closure is constructed from a one-piece paperboard blank and is characterized by its secure fit with the top of the container and its ability to unlock and flatten after use for re-use.

BACKGROUND OF THE INVENTION

Paperboard container closures have, heretofore, been made for telescoping over the open top or bottom of a container. Such container closures generally comprise a cut, scored and folded sheet of paperboard. The container closures, after assembly, are often held together by glue, staples or the like so that they cannot be flattened for later re-use.

In addition, the container closures merely telescope over the top or bottom of a container; the container closures do not present a friction stop which is wedged between the container closure and the exterior of the container for a tight, friction fit.

Examples of such prior art devices are illustrated in U.S. Pat. No. 3,993,240 issued on Nov. 23, 1976 to Graphic Arts Packaging Corporation. This patent relates to three blanks which may be composed of paperboard, or other suitable material, and which are used to form a rectangular box with a rectangular detachable lid, which is permanently secured after folding with glue.

U.S. Pat. No. 4,313,555 relates to a carton having a bottom tray and cover element. Opposite corners of both the tray and cover element include a locking flap assembly which is part of the adjacent sidewalls of each element. Those locking flaps are used to assemble the tray and cover. The locking flap assemblies include a hook cut in a sidewall flap extension received within a slot cut in an adjacent sidewall.

U.S. Pat. No. 5,402,932 relates to a receptacle having pairs of opposed side panels which are connected by connector flaps. The connector flaps have two relatively movable flap portions. Those flap portions cooperate with friction stops formed in the side panels to lock the receptacle into assembled condition and prevent up and down movement of the connector flaps relative to the rest of the receptacle structure.

U.S. Pat. No. 4,469,273 relates to a reusable container closure which telescopes over the open top or bottom of the container. The closure side walls have locking flaps at each end. The closure end walls wrap around the locking flaps to hold the closure side and end walls in upright position. Temporary locking elements bear against the inner face of the inner end wall and hold the end and side walls in position. The temporary locking elements are formed from and hinged to at least one of the central or side panels and are bent from the planes of these panels to hold the side and end panels in place. When the closure is telescoped over the container, the container pushes the locking elements back into the plane of the panels in place. When the closure is removed the side and end panels are no longer held in place and may be flattened for reuse easily.

U.S. Pat. No. 3,926,362 relates to a telescoping container formed by utilizing a one-piece corrugated paperboard blank which is scored and slotted in a predetermined pattern and severable into two blanks which are adapted to be folded into telescoping cover and body members.

U.S. Pat. No. 4,214,694 relates to a box cover with a top panel, fold over sides and fold over ends, the fold over ends including a corner assembly friction stop. The box cover is secured after folding with glue.

It is an object of the present invention to provide a container closure which can be unlocked and flattened after use for re-use.

It is also an object of this invention to provide a container closure having a friction stop which is wedged between the container closure and the exterior of the container when the container closure is telescoped over the container for a tight, friction fit.

The broadest aspect of this invention relates to a container closure comprising a sheet of paperboard folded to present a central panel; at least three side panels depending from the central panel; at least a first of the side panels having a corner flap; a second of the side panels adjacent to the first side panel having a notch; the first side panel and the second side panel meeting to form a corner; the corner flap folded about the corner to lie against the second side panel; the corner flap having a friction stop folded to engage the notch; the friction stop extending through the notch; the friction stop being displaceable towards the second side panel when the container closure is telescoped on a container.

A further aspect of this invention relates to a blank of paperboard for forming a container closure, the blank comprising: a central panel; at least three upright side panels connected to the central panel along first fold lines; the side panels foldable about the fold lines to define the container closure in an erected position; at least a first of the side panels having a corner flap connected to the first side panel along a second fold line; a second of the side panels adjacent to the first side panel, having a notch; the first side panel and the second side panel forming a corner when the blank is folded in its erected position; the corner flap being foldable about the corner to lie against the second side panel when the blank is in its erected position; the corner flap having a friction stop foldable to engage the notch; the friction stop extending through the notch when the blank is in its erected position; the friction stop being towards the second side panel when the blank is in its erected position and is then telescoped on a container.

DETAILED DESCRIPTION OF THE INVENTION

Referring now in detail to the drawings, the reader will readily appreciate from the figures that the subject matter of the invention disclosed herein may take the form of a container closure of paperboard material or the like and which may be used to close a box, for example. It is to be understood, however, the present invention is not to be limited in use as a container closure, but instead may be put to any use as may be appropriate from considerations given to its structural characteristics.

Figure 1:
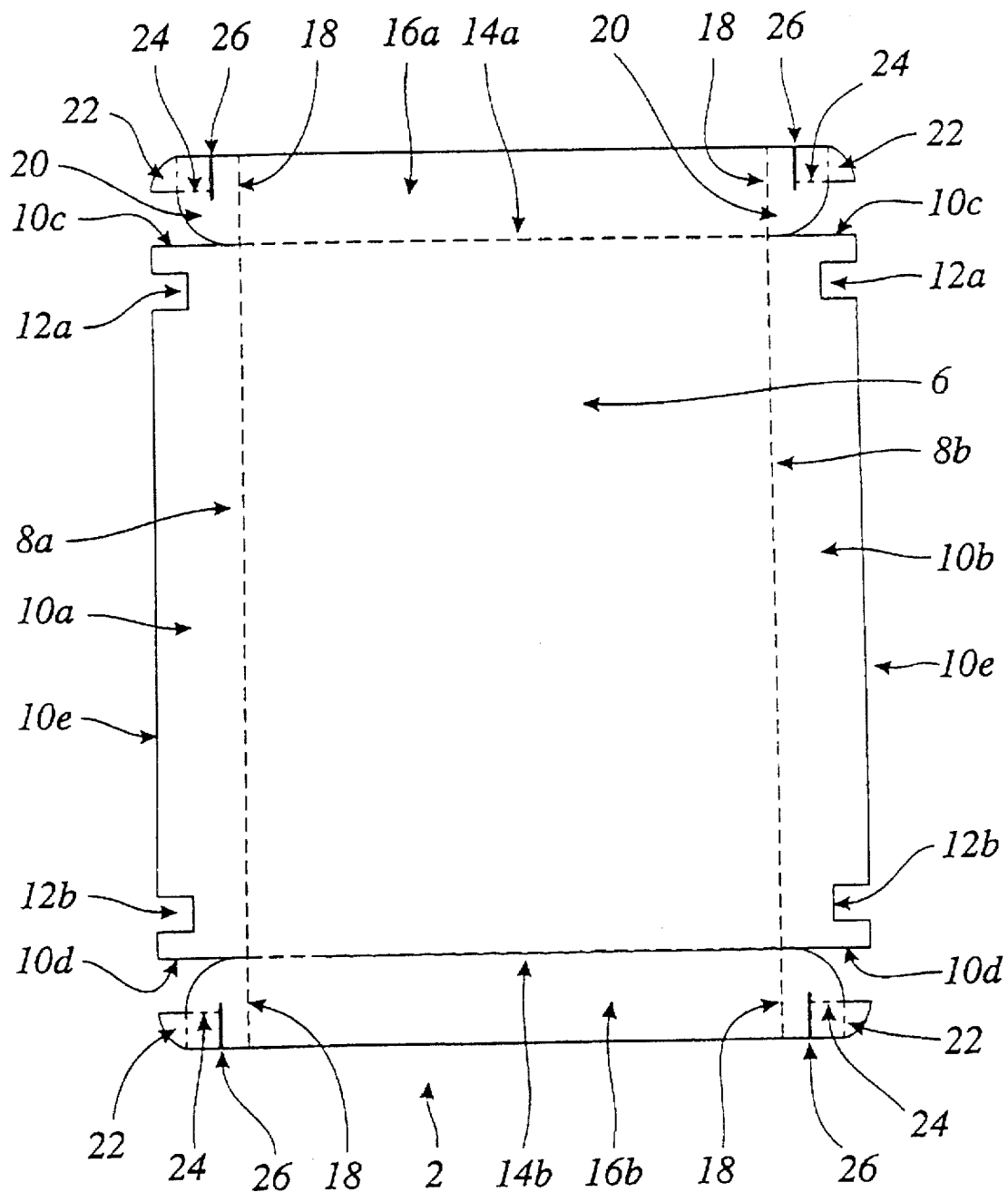
FIG. 1 is a plan view of a blank for forming the container closure of the present invention.
Figure 7:
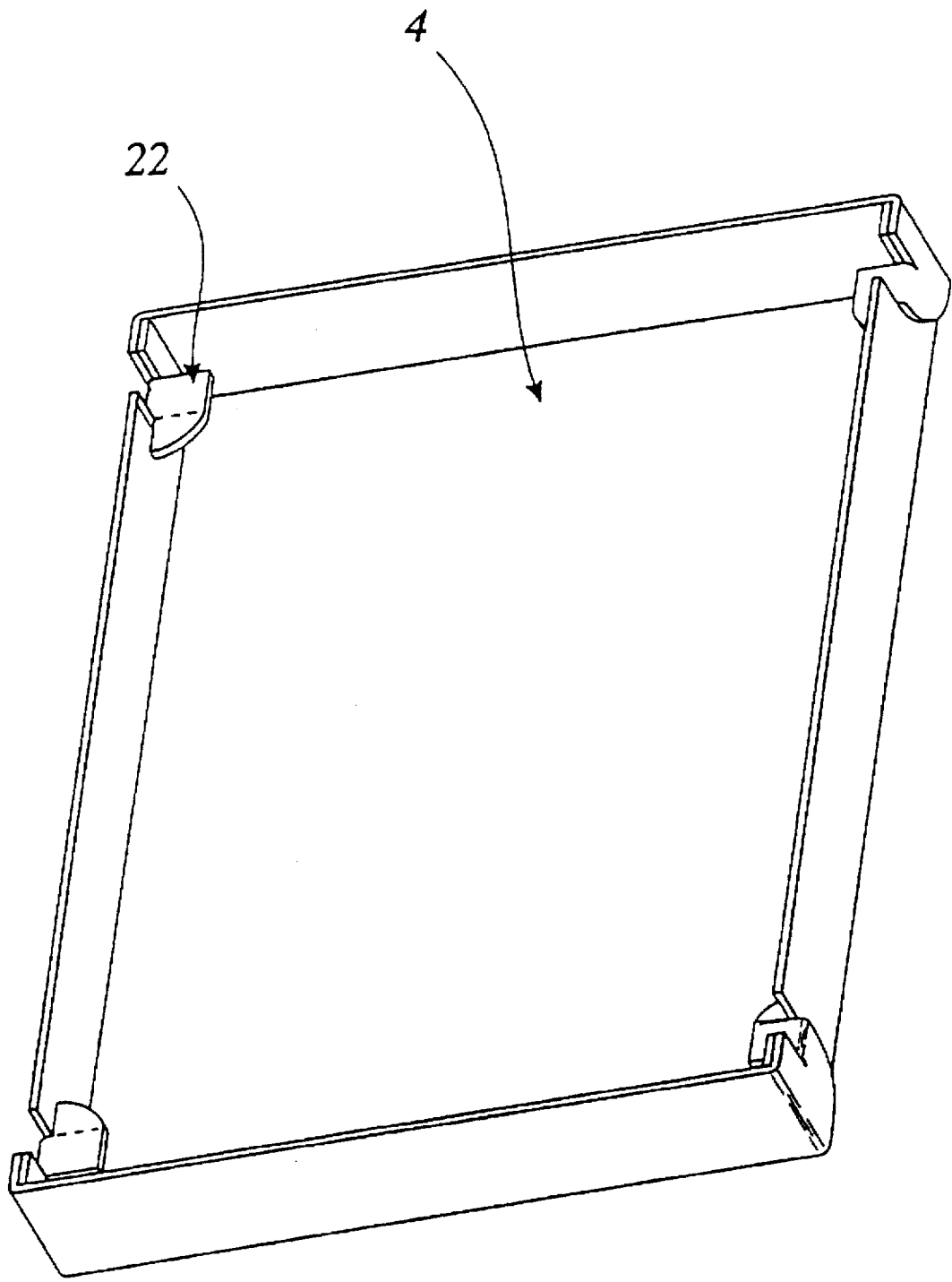
FIG. 7 is a perspective view of the erected container closure assembled from the blank of FIG. 1.

Like parts have been given like numbers throughout the figures. FIG. 1 is a top view of a blank 2 of paperboard for producing a paperboard container closure 4, shown in FIG. 7. Paperboard container closure 4 can be made of cardboard or similar materials well-known to those persons skilled in the art.

Blank 2 is best shown in FIG. 1. Blank 2 includes a rectangular-shaped central panel 6. Blank 2 has a first pair 8 of longitudinal, parallel fold lines 8a and 8b. Adjacent and abutting the central panel 6 along fold lines 8 is a first pair 10 of opposed side panels 10a and 10b. Each of side panels 10 has a periphery comprising opposite end edges 10c and 10d, and longitudinal edges 10e. Each of edges 10e include a pair 12 of notches 12a, 12b. Notches 12a, 12b are equally spaced from edges 10c and 10d respectively.

Blank 2 further includes a second pair 14 of transverse, parallel fold lines 14a and 14b. Adjacent and abutting the central panel 6 along fold lines 14 is a second pair 16 of opposed side panels 16a and 16b. Adjacent and abutting side panels 16 along longitudinal, parallel fold lines 18 are corner flaps 20. Fold lines 18 are parallel to and outset from fold lines 8 a distance substantially equal to the thickness of cardboard utilized in blank 2.

Figure 2:
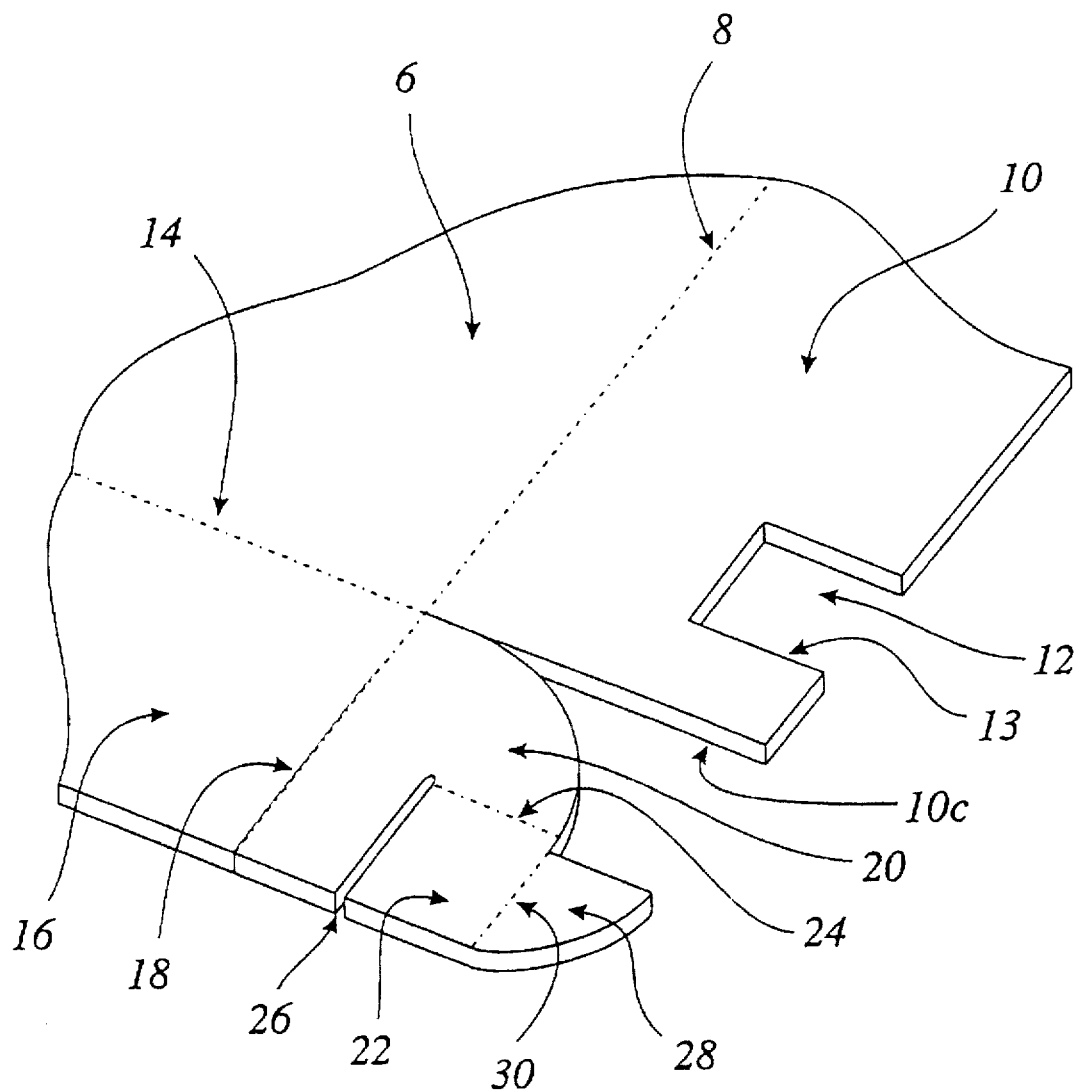
FIG. 2 is an partial perspective view of the blank shown in FIG. 1

Referring now to FIG. 2, corner flap 20 comprises a tab or friction stop 22. Friction stop 22 is hingedly connected to corner flap 20 along fold line 24. In the top view of FIG. 1, fold line 24 is substantially parallel to fold line 14 and is substantially normal to fold line 18. Friction stop 22 is separated from corner flap 20 by line of cut 26 to permit rotational movement of friction stop 22 about fold line 24. Line of cut 26 is parallel to and spaced from fold line 18 at a distance substantially equal to the distance between the proximate edge 13 of adjacent notch 12 and the end 10c of adjacent side panel 10. Line of cut 26 has a width approximately equal to twice the thickness of cardboard utilized in blank 2. Fold line 24 terminates at line of cut 26.

Friction stop 22 presents a wing 28. Wing 28 extends beyond the end of fold line 24. Wing 28 is hingedly connected to friction stop 22 along fold line 30 to permit rotational movement of wing 28 about fold line 30 and to permit foldable engagement of friction stop 22 with notch 12. When wing 28 is folded along fold line 30 at an acute angle or perpendicular from friction stop 22, friction stop 22 can be introduced in adjacent notch 12 as is shown in FIGS. 4 and 5.

Figure 3:
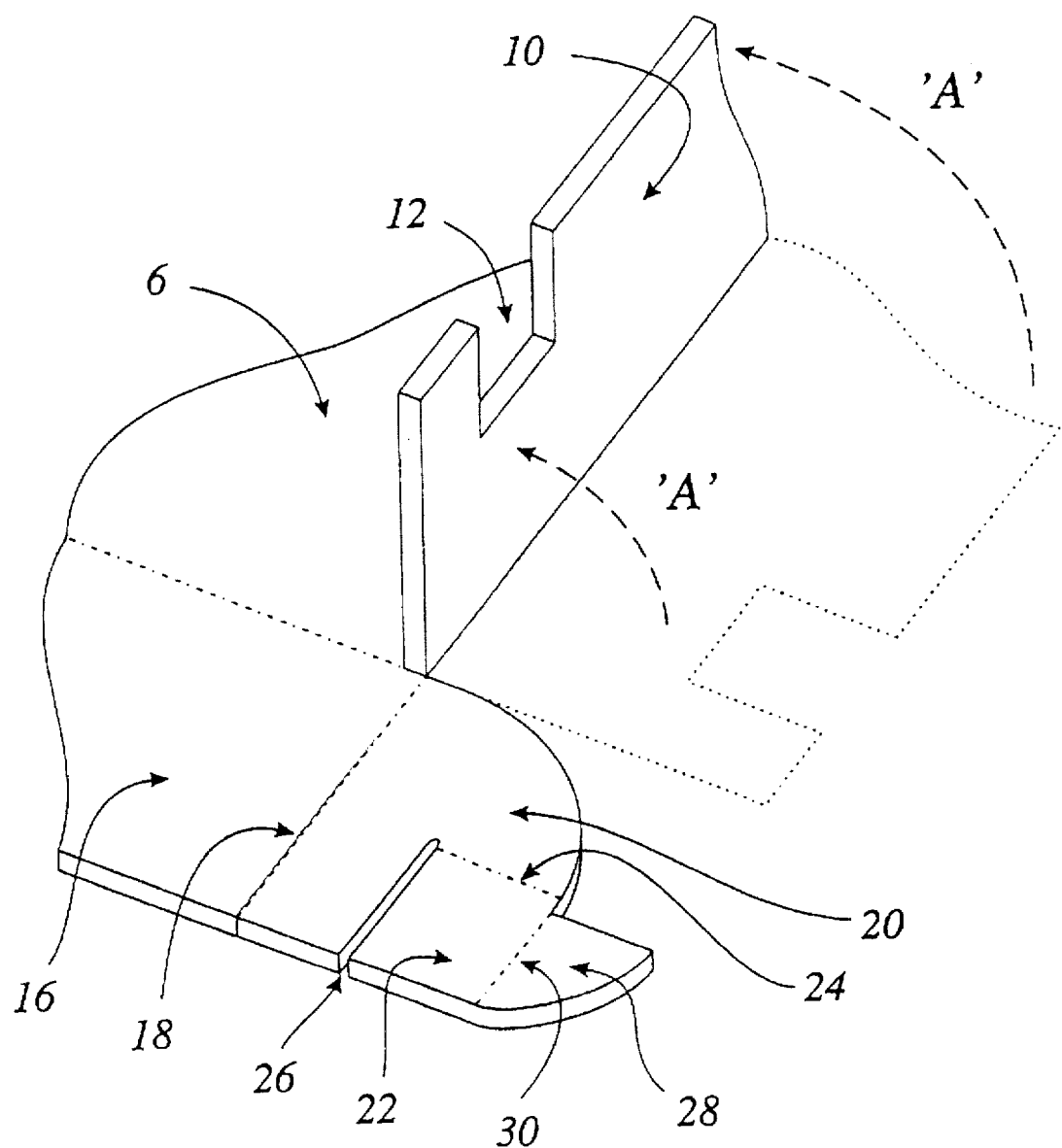
FIG. 3 is a partial assembly view of the blank shown in FIG. 2
Figure 4:
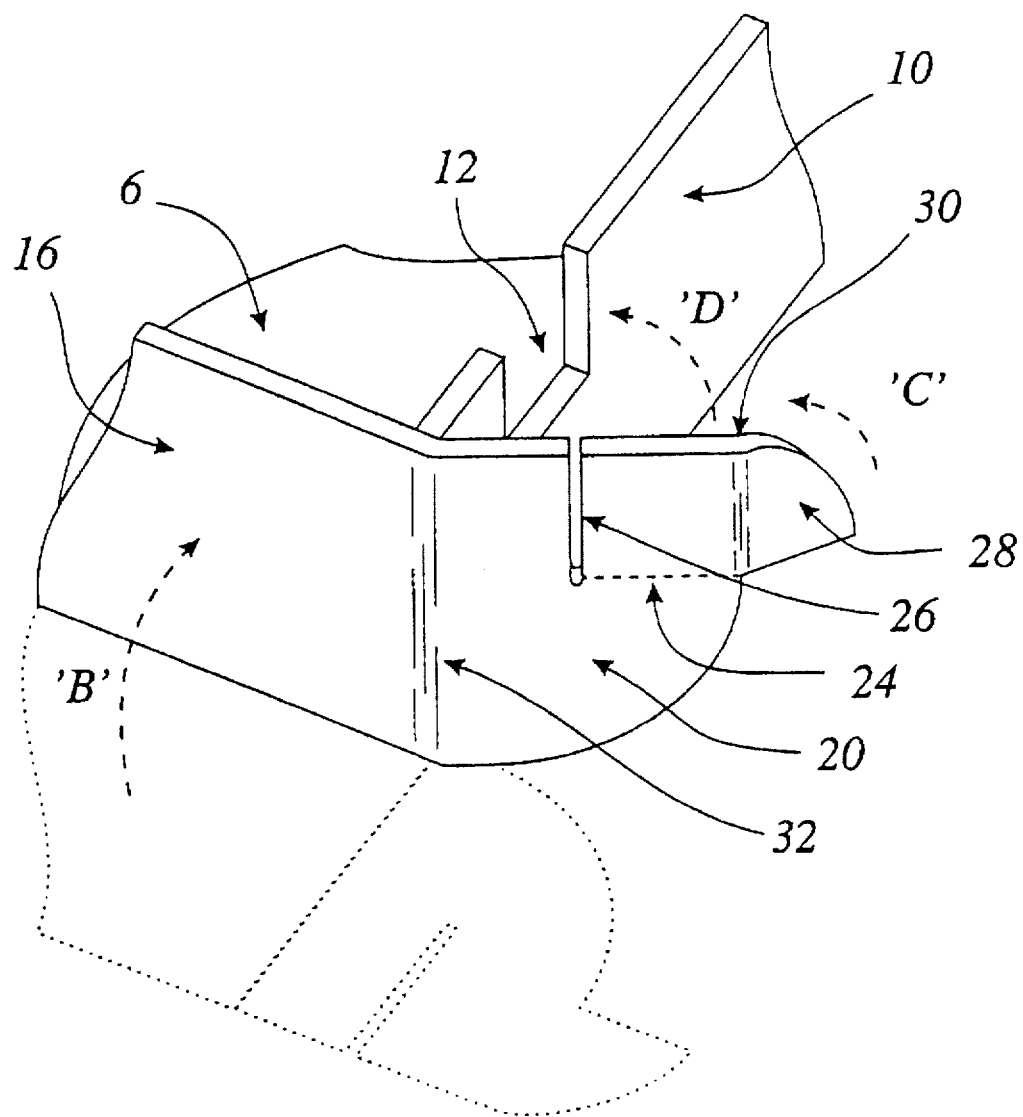
FIG. 4 is a partial assembly view of the blank shown in FIG. 3
Figure 5:
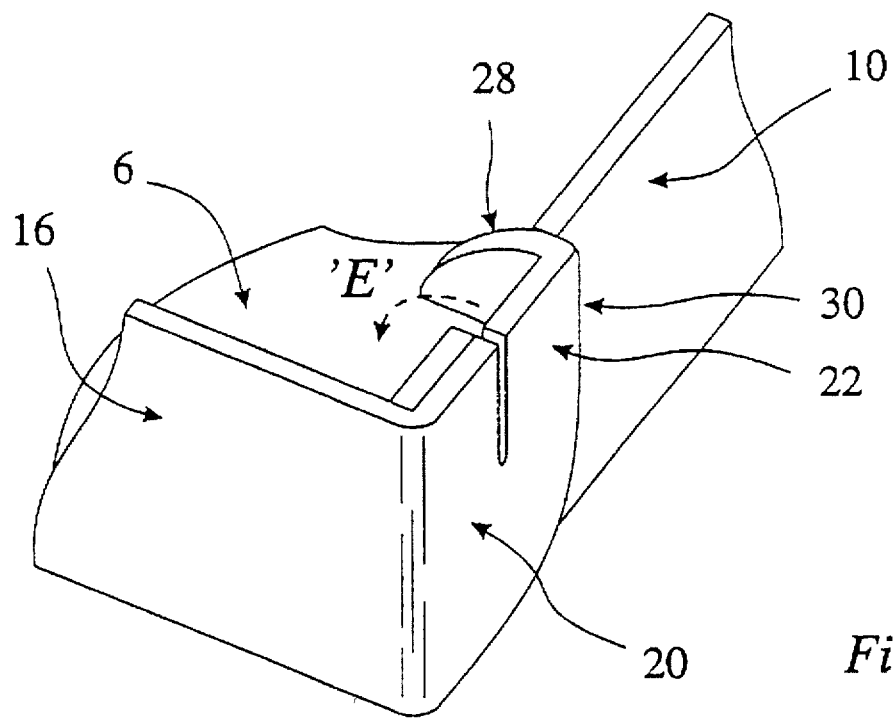
FIG. 5 is a partial assembly view of the blank shown in FIG. 4
Figure 6:
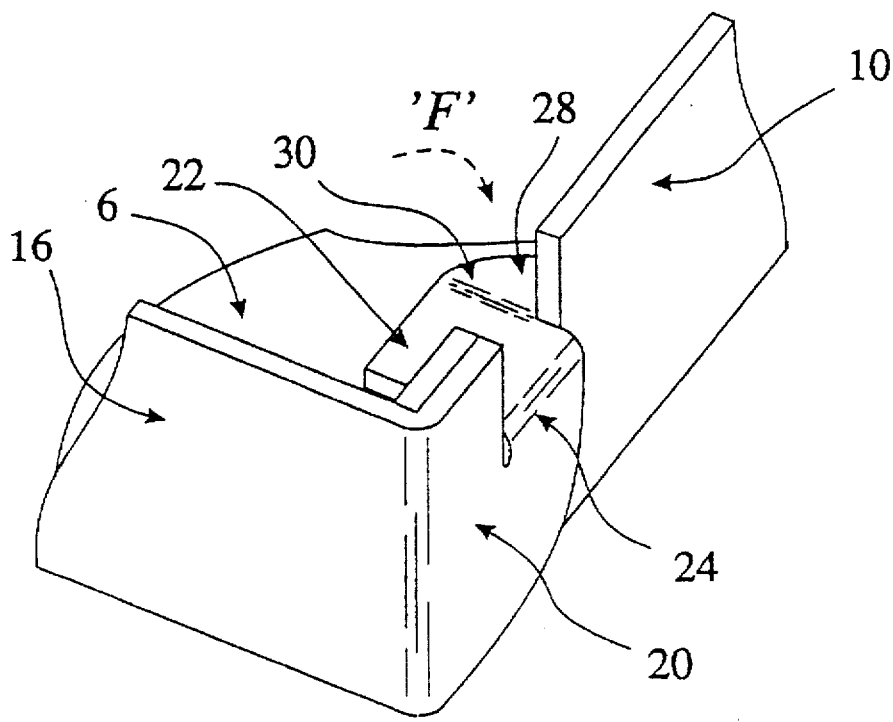
FIG. 6 is a partial assembly view of the blank shown in FIG. 5

Referring now to FIGS. 2, 3 and 4, in erecting the container closure 4 from blank 2, side panel 10 is folded at an angle A of 90 degrees about fold line 8 and side panel 16 is folded at an angle B of 90 degrees about fold line 14 such that side panel 10 and side panel 16 meet to form corner 32 as is best shown in FIG. 4. Corner flap 20 is then folded in the direction of arrow D about corner 32 to lie against side panel 10 as illustrated in FIGS. 4 and 5. When corner flap 20 is in this position, friction stop 22 is substantially aligned with notch 12, and line of cut 26 is substantially aligned with the proximate end 13 of notch 12. Wing 28 is inwardly folded in the direction of arrow C about fold line 30 (alternatively wing 28 may be outwardly folded) so that friction stop 22 can be introduced in notch 12. With wing 28 in this position, friction stop 22 is folded about fold lines 24 to engage notch 12. When friction stop 22 extends through notch 12, wing 28, being biased in a substantially co-planar relationship with the friction stop 22, substantially springs back in the direction of arrow F into the plane defined by friction stop 22. Wing 28 abuts the interior surface of side panel 10. When friction stop 22 extends inwardly of notch 12 and wing 28 abuts the interior surface of side panel 10 as described herein, corner flap 20 is in a locked position which maintains side panels 10 and 16 in an upright position relative to the main panel 6.

Figure 8:
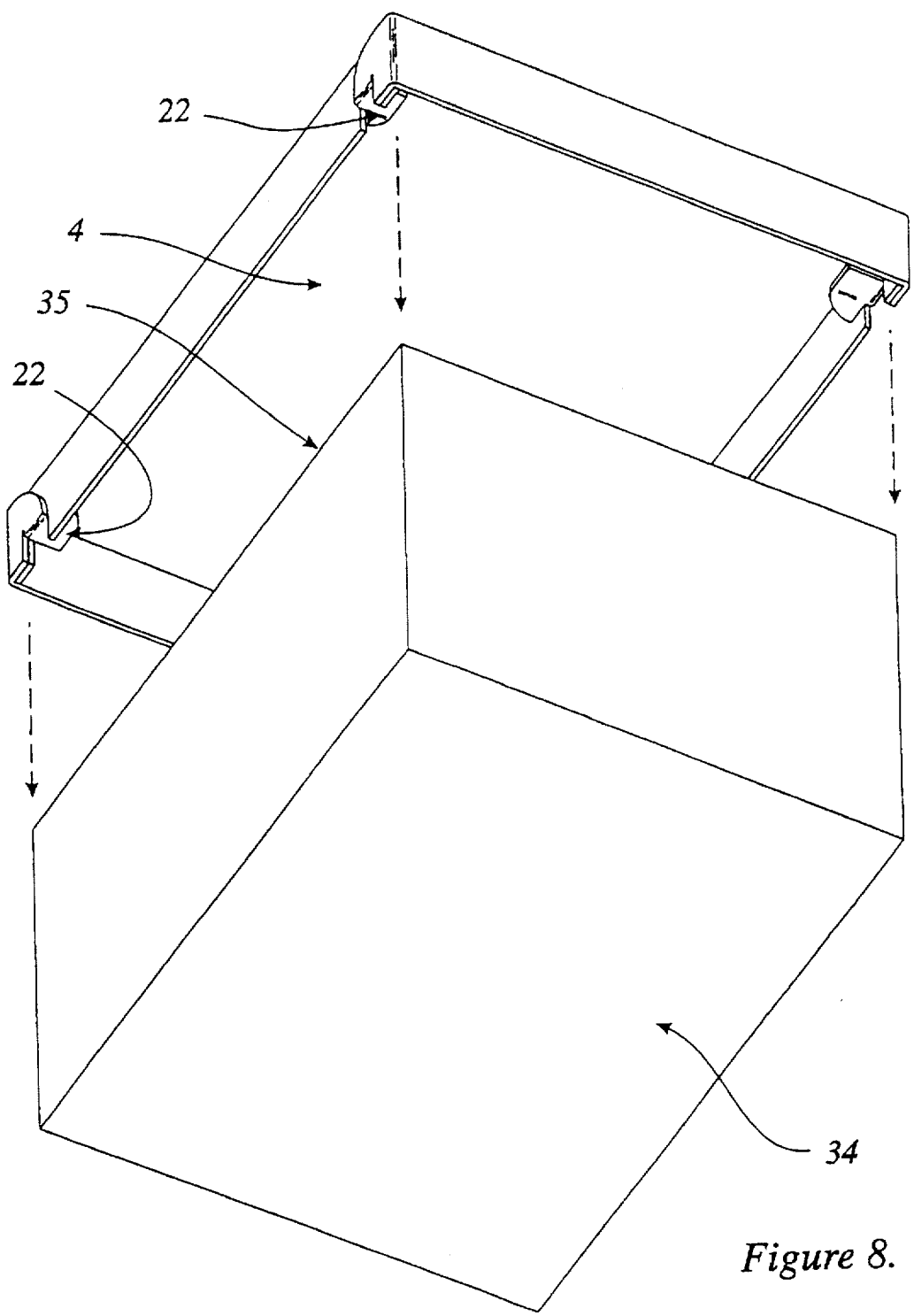
FIG. 8 is a perspective view of the erected container closure of FIG. 7 before it is telescoped over a container.

Container closure 4 is sized to be telescopingly positioned over container 34, as is further described herein and is illustrated by FIG. 8. When container closure is telescoped on container 34, the top edge 35 of container 34 urges friction stops 22 back toward the plane of upright side panels 10. Corner flaps 20 are thus captured, locking side panels 10, 16 in upright position. When container closure 4 is fully telescoped over container 34, friction stops 22 are wedged between the interior surface of side panels 10 and the exterior surface of side panels 36 of container 34. In this fully telescoped position, container closure 4 frictionally engages container 34. In other words, the friction stops 22, and thus container closure 4, embraces the top of container 34 in a friction fit.

When container closure 4 is later removed from container 34, friction stops 22 and wings 28 can be unfolded to release friction stops 22 from engagement with notches 12. Corner flaps 20 will then be released from their locked position. Side panels 10, 16 will be released from their upright position, allowing container closure 4 to be flattened and returned for re-use.

While corner flaps 20 and notches 12 have been disclosed for forming a flap lock assembly, notches 12a and 12b could be provided along edges 10e of side panels 10 unspaced from edges 10c and 10d and corner flaps 20 could be accordingly adapted so as to form a corner lock. However, when line of cut 26 is spaced from corner 32, corner 32 is reinforced by corner flap 20 and thereby strengthened.

Blank 2 may be cut and scored by press die, by roller die or by like means.

Similarly, while the drawings and specification describe a four-sided container closure, the invention is not limited to a four-sided container closure, but also relates to container closures having three or more sides.

It will be obvious to those skilled in the art that various changes may be made without departing from the scope of the invention.

I claim:

1. A container closure, comprising a sheet of paperboard folded to present:
    a central panel;
    at least three side panels depending from said central panel;
    at least a first of said side panels having a corner flap;
    a second of said side panels, having a notch; said first side panel and said second side panel meeting to form a corner;
    said corner flap folded about said corner to lie against said second side panel;
    said corner flap having a friction stop folded about said corner flap to engage said notch;
    said friction stop extending through said notch;
    said friction stop being displaceable toward said second side panel when said container closure is telescoped on a container.

2. The container closure as claimed in claim 1 wherein said friction stop is separated from said corner flap by a line of cut to permit rotational movement of said friction stop relative to said corner flap.

3. The container closure as claimed in claim 2 wherein said line of cut is spaced from said corner for strengthening said corner of said container closure.

4. The container closure as chimed in claim 3 wherein said notch presents a proximate end of said notch relative said corner flap and said line of cut is aligned with the proximate end of said notch.

5. The container closure as claimed in claim 1 wherein said friction stop is hingedly connected to said corner flap along a fold line.

6. The container closure as claimed in claim 5 wherein said fold line is normal to said corner.

7. The container closure as claimed in claim 1 wherein said friction stop presents a wing to capture said corner flap in a locked position.

8. The container closure at claimed in claim 7 wherein said wing and said friction stop extend inwardly of said notch and said wing abuts an interior surface of said second side panel so as to present said corner flap in a locked position.

9. The container closure as claimed in claim 4 wherein said friction stop is hingedly connected to said corner flap along a fold line and said fold line is normal to said corner.

10. The container closure as claimed in claim 9 wherein said friction stop presents a wing for capturing said corner flap in a locked position, and said wing and said friction stop extend inwardly of said notch and said wing abuts in interior surface of said second side panel so as to present said corner flap in a locked position.

11. The container closure as claimed in claim 10 wherein said wing is hingedly connected to said friction stop along a fold line to permit foldable engagement of said friction stop with said notch.

12. A blank of paperboard for forming a container closure, said blank comprising:

a central panel;

at least three upright side panels connected to said central panel along first fold lines, said side panels foldable about said fold lines to define said container closure in an erected position;

at least a first of said side panels having a corner flap connected to said first side panel along a second fold line;

a second of said side panels having a notch:

said first side panel and said second side panel forming a corner when said blank is folded in said erected position;

said corner flap is foldable about said corner to lie against said second side panel when said blank is folded in said erected position;

said corner flap having a friction stop foldable about said corner flap to engage said notch;

said friction stop extending through said notch when said blank is folded in said erected position;

said friction stop being displaceable toward said second side panel when said blank is folded in said erected position and is then telescoped on a container.

13. A blank as claimed in claim 12 wherein said friction stop is separated from said corner flap by a line of cut to permit rotational movement of said friction stop relative to said corner flap.

14. A blank as claimed in claim 13 wherein said notch presents a proximate end of said notch relative said corner flap and said line of cut is spaced from said corner to be aligned with the proximate end of said notch.

15. A blank as claimed in claim 12 wherein said friction stop is hingedly connected to said corner flap along a third fold line and said third fold line is normal to said corner when said blank is folded in said erected position.

16. A blank as claimed in claim 14 wherein said friction stop is hingedly connected to said corner flap along a third fold line and said third fold line is normal to said corner when said blank is folded in said erected position.

17. A blank as claimed in claim 16 wherein said friction stop presents a wing to capture said corner flap in a locked position when said blank is folded in said erected position.

18. A blank as claimed in claim 17 wherein said corner flap is in a locked position when said wing and said friction stop extend inwardly of said notch and said wing abuts an interior surface of said second side panel.

19. A blank as claimed in claim 18 wherein said wing is hingedly connected to said friction stop along a fourth fold line to permit foldable engagement of said friction stop with said notch.

* * * * *